US 8,647,204 B2

(12) United States Patent
Kando

(10) Patent No.: US 8,647,204 B2
(45) Date of Patent: Feb. 11, 2014

(54) GAME DEVICE AND GAME PROGRAM THAT PERFORMS SCROLL AND MOVE PROCESSES

(75) Inventor: Yuuji Kando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/372,553

(22) Filed: Feb. 14, 2012

(65) Prior Publication Data

US 2012/0142413 A1 Jun. 7, 2012

Related U.S. Application Data

(62) Division of application No. 11/336,875, filed on Jan. 23, 2006, now Pat. No. 8,137,196.

(30) Foreign Application Priority Data

May 12, 2005 (JP) .................................. 2005-140132

(51) Int. Cl.
*A63F 13/06* (2006.01)
*G09G 5/32* (2006.01)
*G09G 5/34* (2006.01)

(52) U.S. Cl.
USPC ................. 463/37; 463/31; 463/36; 345/684; 345/685; 345/686; 345/687; 345/688

(58) Field of Classification Search
USPC .......................... 463/37, 31, 36; 345/684–688
See application file for complete search history.

(56) References Cited

U.S. PATENT DOCUMENTS 5,550,969 A * 8/1996 Torres et al. .................. 715/787
5,568,603 A * 10/1996 Chen et al. .................... 715/784
5,844,547 A * 12/1998 Minakuchi et al. ........... 345/173
6,267,676 B1 7/2001 Nagaoka
2001/0006908 A1 7/2001 Fujioka et al.

(Continued)

FOREIGN PATENT DOCUMENTS

JP 06-230888 8/1994
JP 2002-939 A 1/2002

(Continued)

OTHER PUBLICATIONS

Ito, Yasuyuki, "Ragnarok Online Official Guide 2004 Summer," Japan, SOFTBANK Publishing Inc., Apr. 27, 2004, first edition, p. 15, with partial English translation.

(Continued)

*Primary Examiner* — Werner Garner
(74) *Attorney, Agent, or Firm* — Nixon & Vanderhye P.C.

(57) ABSTRACT

A video game program and a video game device are disclosed. If there is no move instruction from the player through a touch panel, the game image displayed on the display screen is scrolled if the position indicated by an input position from the touch panel is included within a first peripheral area along the periphery of the display screen. If there is a move instruction from the player through the touch panel, the game image displayed on the display screen is scrolled if the position indicated by the input position from the touch panel is included within a second peripheral area, larger than the first peripheral area, along the periphery of the display screen. Thus, in a video game device using a touch panel, an appropriate scroll process according to the status of the game is established, thereby improving the operability of the device.

6 Claims, 12 Drawing Sheets

(56) References Cited

U.S. PATENT DOCUMENTS

| | | | |
|---|---|---|---|
| 2002/0067347 A1 | 6/2002 | Maezawa et al. | |
| 2002/0137557 A1 | 9/2002 | Ishii et al. | |
| 2005/0130738 A1* | 6/2005 | Miyamoto et al. | 463/30 |

FOREIGN PATENT DOCUMENTS

| | | |
|---|---|---|
| JP | 2002-123369 A | 4/2002 |
| JP | 2002-200337 A | 7/2002 |
| JP | 2002-278691 A | 9/2002 |

OTHER PUBLICATIONS

Ito, Yasuyuki, "Seal Online Official Adventure Drill," Japan, SOFTBANK Publishing Inc., Nov. 6, 2004, first edition, p. 12, with partial English translation.

Conflict Zone Instruction Manual, 2000, Ubi Soft Entertainment, pp. 14-15, 18-19, 22-23.

Homeworld 2 Gameplay Guide, 2003, Siena Entertainment Inc., pp. 19-24, 49, 51, 68.

"Gateway 71 OX Performance—Specifications" Gateway Support. Dec. 24, 2003, Gateway, Inc. <http://web.archive.org/web/200311 051 00254/prod ucts.gateway .com/prod ucts/GConfig/proddetai ls.asp?system id=71 Oxp&seg=hm>.

"Viewsonic VG700b 17in LCD Black—Specifications" Gateway Support. Dec. 24, 2003, Gateway, Inc. <http:/lweb.archive.org/web/ 20040312043938/accessories.gateway. com/ AccessoryStore/ PC+Accessories 316441/Monitors_316684/LCD+ Q 1—Flat+ Panel_ Q1—+Monitors 316694/15 D1—17+inch+LCD 381953/ 2440381_proddetail. htm?ref=merch>.

("Game.com" Vidgame.net. Jun. 26, 2003. Vidgame.net. <http://web. archive.org/web/20030626035028/http://www.vidgame. neUTIGER/GC.html>.

"Palm Games news." Palm Games. Apr. 1, 2001. Internet Archive. Jul. 17, 2008 <http://web.archive.org/web/2001 0331 012711/www. palm-games.com/news.htm>.

"Games List." Palm Games. Apr. 1, 2001. Internet Archive. Jul. 17, 2008 <http://web.arch ive.org/web/2001 0331 043209/www. palm-games. com/index. htm>.

"Sea War Game." Palm Games. Apr. 1, 2001. Internet Archive. Jul. 17, 2008 <http://web.archive.org/web/2001 0408062844/www. palm-games.com/seawar/index.htm>.

Provinciano, Brian, "The Tiger Game.com Handheld & Reverse Engineering" Brian Provinciano's—The Low Level. Jan. 16, 2005 <http://bripro.com/low/gamecom/index.php>.

Provinciano, Brian, "Tiger Game.com—Game Screen Shots (p. 3 of 4)" Brian Provinciano's—The Low Level. Jan. 16, 2005 <http:// bripro.com/low/gamecom/index.php?page=games3>.

"Duke Nukem 3d Instruction Manual for Sega Saturn", 1997, 3D Realms.

Sterbakov, Hugh. "Mortal Kombat Trilogy for Playstation Review" Games pot. Dec. 1, 1996. < http://www. games pot. co m/ps/ actio n/mo rta I ko mbattri logy /review. htm I ?sid= 2548427 &print= 1 >.

"Resident Evil 2: Differences FAQ" IGN Entertainment Games. <http://faqs.ign.com/articles/378/378659p1.html>).

Conflict Zone Instruction Manual, 2000, Ubi Soft Entertainment.

Homeworld 2 Gameplay Guide, 2003, Sierra Entertainment Inc.

"Sea War Game." Palm Games. Apr. 8, 2001, <http://web.archive. org/web/20010408062844/www.palmgames.com/seawar/index. htm>.

"Touhou Project." Wikipedia, The Free Encyclopedia, May 28, 2005, <http://en.wikipedia.org/w/index.php?title=Touhou_Project& oldid=14342058>.

* cited by examiner

FIG. 13

| CHARACTER INFORMATION | | 42 |
|---|---|---|
| IMAGE DATA | | |
| STATUS DATA | | |
| CHARACTER NUMBER | CURRENT POSITION | OPERATED OBJECT FLAG |
| PC1 | (X1,Y1) | OFF |
| PC2 | (X2,Y2) | ON |
| PC3 | (X3,Y3) | OFF |
| EC | (X4,Y4) | - |
| ⋮ | ⋮ | ⋮ |

# GAME DEVICE AND GAME PROGRAM THAT PERFORMS SCROLL AND MOVE PROCESSES

CROSS REFERENCE TO RELATED APPLICATIONS

This application is a divisional of U.S. Ser. No. 11/336,875, filed Jan. 23, 2006, which claims the benefit of Japanese Patent Application No. 2005-140132, filed May 12, 2005, each of which is incorporated herein in its entirety.

BACKGROUND

1. Field of the Technology

The technology presented herein relates to a video game program and a video game device and, more particularly, to a video game program and a video game device using position inputting means such as a touch panel as an input device.

2. Description of the Background Art

There are conventional techniques that allow the user to scroll the screen by using a pointing device such as a touch panel.

Japanese Laid-Open Patent Publication No. 6-230888 (paragraph [0025]) discloses a technique for an information processing device having a touch panel and a display device, in which when a peripheral area of a touch panel is touched by a stylus pen, the display area of the display device is moved to another display area in the direction corresponding to the touched peripheral area.

With this conventional technique, however, a sufficient operability may not be realized under some circumstances because the peripheral areas are fixed.

For an input device of a video game, it is particularly desirable to realize an optimal operability according to the status of the game.

SUMMARY

Therefore, a primary feature of an example embodiment presented herein is to provide a video game device using position inputting means, which performs an appropriate scroll process according to the status of the game, thereby improving the operability.

The example embodiment has the following features to attain the above. Note that reference numerals are shown in parentheses below for assisting the reader in finding corresponding components in the figures to facilitate the understanding of the present invention, but they are in no way intended to restrict the scope of the invention.

A first aspect of the example embodiment is directed to a computer-readable storage medium storing a video game program for instructing a computer (21), being connected to a display screen (12) for displaying a game image, to position inputting means (15) for specifying a position on the display screen and to a memory (24) for temporarily storing data, to function as display control means, storage means, movement control means and scroll control means. The display control means is means for producing a game image including an object that can be moved by a player and displaying the produced game image on the display screen. The storage means is means for successively storing, in the memory, position data each corresponding to a position on the display screen inputted through the position inputting means. The movement control means is means for moving the object toward a position indicated by the position data stored in the memory in response to a move instruction from the player. The scroll control means is means for, (a) while there is no move instruction from the player, scrolling the game image being displayed by the display control means on the display screen on a condition that a position indicated by the position data stored in the memory is included within a first peripheral area along at least a portion of a periphery of the display screen, and (b) while there is a move instruction from the player, scrolling the game image being displayed by the display control means on the display screen on a condition that a position indicated by the position data stored in the memory is included within a second peripheral area, different from the first peripheral area, along at least a portion of a periphery of the display screen.

According to a second aspect, the first peripheral area is smaller than the second peripheral area.

According to a third aspect, the scroll control means controls a scroll speed at which to scroll the game image being displayed by the display control means on the display screen so that the scroll speed is varied between when there is no move instruction from the player and when there is a move instruction from the player.

According to a fourth aspect, the scroll speed when there is a move instruction from the player is lower than that when there is no move instruction from the player.

According to a fifth aspect, the position inputting means is a touch panel provided on the display screen, and the move instruction is given by a slide operation on the touch panel starting from a position at which the object is displayed on the display screen.

A sixth aspect of the example embodiment is directed to a computer-readable storage medium storing a video game program for instructing a computer (21), being connected to a display screen (12) for displaying a game image, to position inputting means (15) for specifying a position on the display screen and to a memory (24) for temporarily storing data, to function as display control means, storage means, object processing means and scroll control means. The display control means is means for producing a game image including an object and displaying the produced game image on the display screen. The storage means is means for successively storing, in the memory, position data each corresponding to a position on the display screen inputted through the position inputting means. The object processing means is means for performing a predetermined process when the object is present at a position indicated by the position data stored in the memory. The scroll control means is means for scrolling the game image being displayed by the display control means on the display screen only when a position indicated by the position data stored in the memory is included within a peripheral area along a periphery of the display screen and the object is not present at the position indicated by the position data.

A seventh aspect of the present invention is directed to a video game device, including a display screen (12) for displaying a game image, position inputting means (15) for specifying a position on the display screen, a memory (24) for temporarily storing data, display control means (21, S28), storage means (21, S12), movement control means (21, S22) and scroll control means (21, S26). The display control means is means for producing a game image including an object that can be moved by a player and displaying the produced game image on the display screen. The storage means is means for successively storing, in the memory, position data each corresponding to a position on the display screen inputted through the position inputting means. The movement control means is means for moving the object toward a position indicated by the position data stored in the memory in response to a move instruction from the player. The scroll control means is means for, (a) while there is no move instruction from the player, scrolling the game image being displayed by the display control means on the display screen on a condition that a position indicated by the position data stored in the memory is included within a first peripheral area along at least a portion of a periphery of the display screen, and (b) while there is a move instruction from the player, scrolling the game image being displayed by the display control means on the display screen on a condition that a position indicated by the position data stored in the memory is included within a second peripheral area, different from the first peripheral area, along at least a portion of a periphery of the display screen.

According to the first aspect, an area based on which a scroll process is performed is varied between when an object is being moved and when the object is not being moved, thereby performing an appropriate scroll process according to the current status, thus improving the operability.

According to the second aspect, while an object is being moved, the game image is scrolled even if the position on the display screen being pointed at by the player is not close to the periphery of the display screen. Therefore, the player can easily move the object while checking the status of the area into which the object is being moved. While the object is not being moved, the game image is not scrolled unless the player points at a position on the display screen that is close to the periphery of the display screen. Therefore, it is possible to prevent the game image from being scrolled against the intention of the player when the player is performing an input operation by using the position inputting means.

According to the third aspect, the scroll speed is varied between when an object is being moved and when the object is not being moved, thereby performing an appropriate scroll process according to the current status, thus improving the operability.

According to the fourth aspect, while an object is not being moved, the game image is scrolled at a relatively high speed. Therefore, the player can comfortably instruct to scroll the game image without feeling stressed. While the object is being moved, the game image is scrolled at a relatively low speed. Therefore, the object being moved by the player will not be scrolled out, and the player can move the object while checking both the status of the object and the status of the area into which the object is being moved, whereby the player can obtain a desirable operation feel.

According to the sixth aspect, the game image is scrolled only when the position indicated by the position inputting means is included within a peripheral area along the periphery of the display screen and there is no object present at the position. Therefore, it is possible to prevent the game image from being scrolled against the intention of the player when the player, using the position inputting means, points at or near the position of the object being in the peripheral area.

These and other features, aspects and advantages of the example embodiment presented herein will become more apparent from the following detailed description of the example embodiment when taken in conjunction with the accompanying drawings.

BRIEF DESCRIPTION OF THE DRAWINGS

FIG. 13 shows a specific example of character information.

DESCRIPTION OF THE PREFERRED EMBODIMENTS

A configuration and an operation of a video game device according to an embodiment will now be described.

Figure 1:
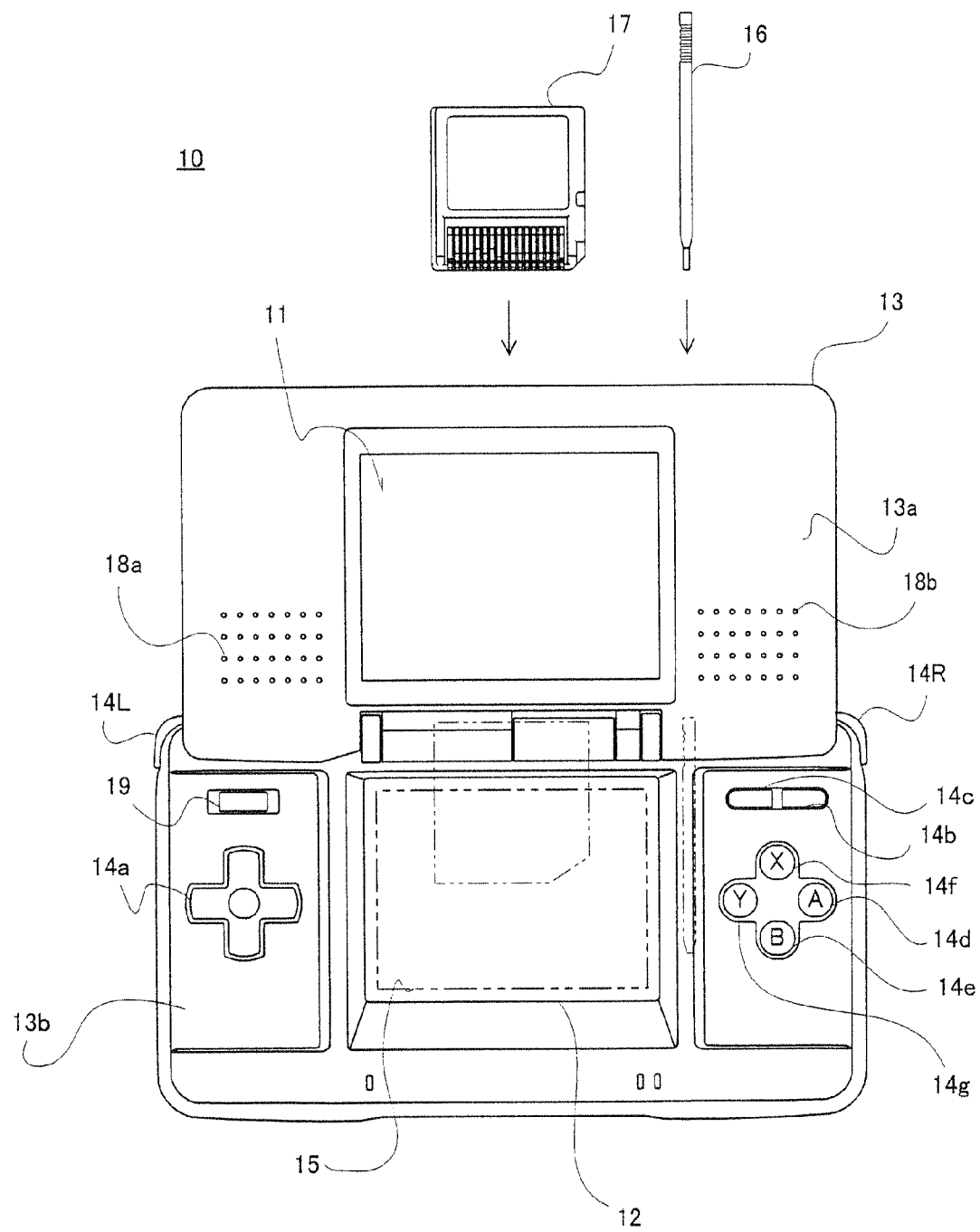
FIG. 1 shows an external view of a video game device according to an embodiment.

FIG. 1 shows an external view of a video game device 10 according to an example embodiment. Referring to FIG. 1, the video game device 10 includes a first LCD (Liquid Crystal Display) 11 and a second LCD 12. A housing 13 includes an upper housing 13a accommodating the first LCD 11, and a lower housing 13b accommodating the second LCD 12. The first LCD 11 and the second LCD 12 both have a resolution of 256×192 dots. While LCDs are used in the present embodiment, the display device may be of any other suitable type, e.g., an EL (Electro Luminescence) display device. Moreover, the resolution of the first LCD 11 and the second LCD 12 is not limited to the particular resolution used herein.

The upper housing 13a includes sound slits 18a and 18b therein for allowing the sound from a pair of speakers (30a and 30b in FIG. 2) to be described later to pass therethrough.

The lower housing 13b includes a set of input devices, including a cross-shaped switch 14a, a start switch 14b, a select switch 14c, an A button 14d, a B button 14e, an X button 14f, a Y button 14g, an L button 14L and an R button 14R. Another input device is a touch panel 15 attached on the screen of the second LCD 12. The lower housing 13b includes a power switch 19 and slots for accommodating a memory card 17 and a stylus 16.

The touch panel 15 may be any of various types of touch-sensitive panels, including a resistive film touch panel, an optical (infrared) touch panel and a capacitance-coupling touch panel. The touch panel 15 is capable of outputting position data corresponding to the contact point on the surface thereof, at which it is being touched with the stylus 16. While it is assumed herein that the player uses the stylus 16 to operate the touch panel 15, it is understood that the touch panel 15 may be operated with a pen (stylus pen) or a fingertip instead of the stylus 16. In the present embodiment, the touch panel 15 has a resolution (detection precision) of 256×192 dots, which is equal to the resolution of the second LCD 12. Note however that it is not necessary that the resolution of the touch panel 15 is equal to that of the second LCD 12.

The memory card 17 is a storage medium storing a video game program, and is received by the slot in the lower housing 13b.

Figure 2:
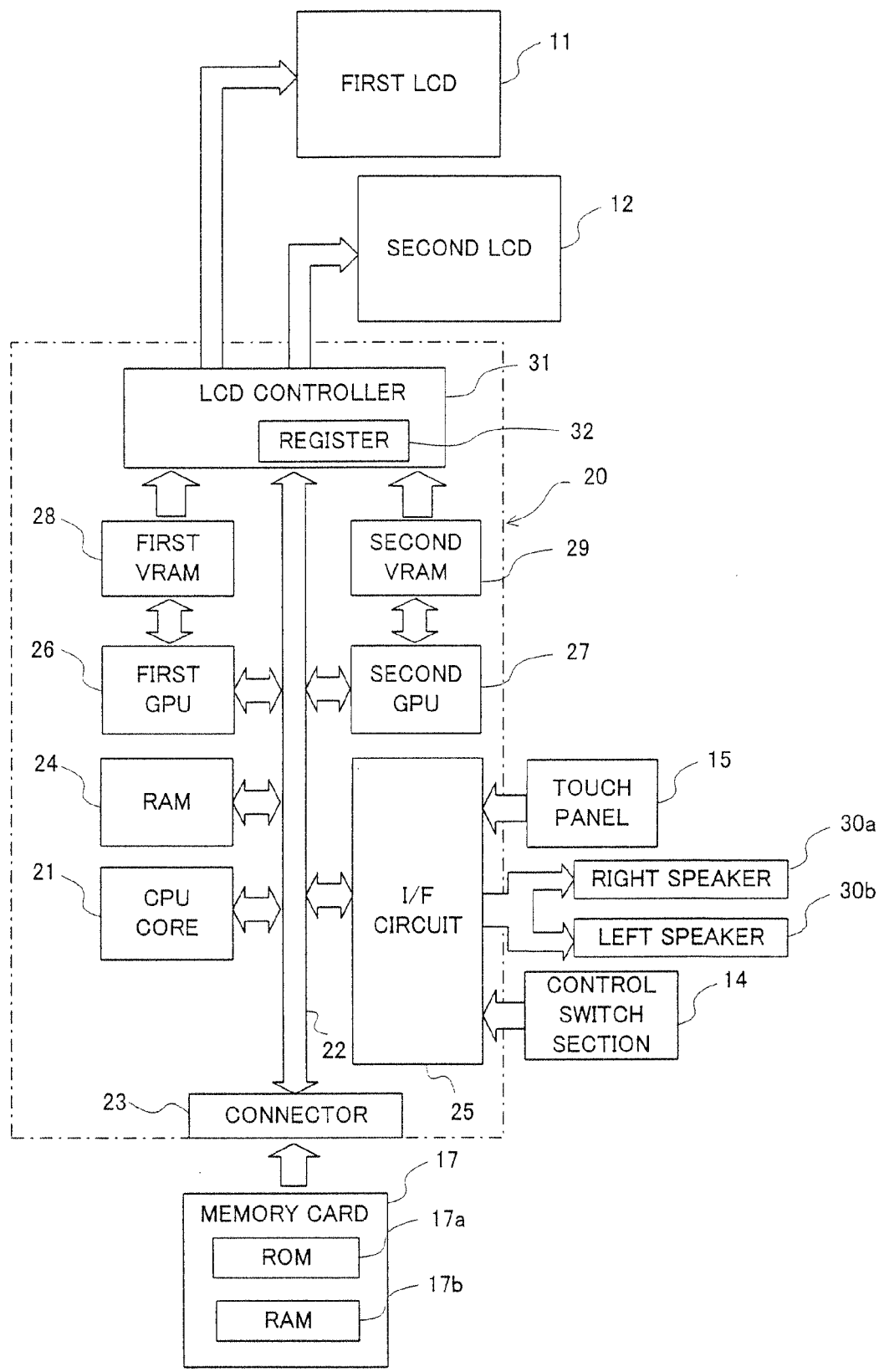
FIG. 2 shows an internal configuration of the video game device.

Referring now to FIG. 2, an internal configuration of the video game device 10 will be described.

Referring to FIG. 2, a CPU core 21 is mounted on an electronic circuit board 20 accommodated in the housing 13. The CPU core 21 is connected to a connector 23, an input/output interface circuit (referred to simply as an "I/F circuit")

25, a first GPU (Graphics Processing Unit) 26, a second GPU 27, a RAM 24 and an LCD controller 31, via a bus 22. The connector 23 can receive the memory card 17. The memory card 17 includes therein a ROM 17a storing a video game program, and a RAM 17b rewritably storing backup data. The video game program stored in the ROM 17a of the memory card 17 is loaded to the RAM 24, and the loaded video game program is executed by the CPU core 21. In addition to the video game program, the RAM 24 also stores temporary data produced while the CPU core 21 is running the video game program, and other data for producing game images. The I/F circuit 25 is connected to the touch panel 15, a right speaker 30a, a left speaker 30b, and a control switch section 14 of FIG. 1 including the cross-shaped switch 14a, the A button 14d, etc. The right speaker 30a and the left speaker 30b are placed behind the sound slits 18b and 18a, respectively.

A first VRAM (Video RAM) 28 is connected to the first GPU 26, and a second VRAM 29 is connected to the second GPU 27. In response to an instruction from the CPU core 21, the first GPU 26 produces a first game image and renders it on the first VRAM 28, based on data stored in the RAM 24 for producing game images. Similarly, the second GPU 27 produces a second game image and renders it on the second VRAM 29 in response to an instruction from the CPU core 21. The first VRAM 28 and the second VRAM 29 are connected to the LCD controller 31.

The LCD controller 31 includes a register 32. The register 32 stores a value of 0 or 1 in response to an instruction from the CPU core 21. When the value stored in the register 32 is 0, the LCD controller 31 outputs the first game image rendered on the first VRAM 28 to the first LCD 11 and outputs the second game image rendered on the second VRAM 29 to the second LCD 12. When the value stored in the register 32 is 1, the LCD controller 31 outputs the first game image rendered on the first VRAM 28 to the second LCD 12 and outputs the second game image rendered on the second VRAM 29 to the first LCD 11.

The configuration of the video game device 10 described above is merely an example, and the example embodiment presented herein is applicable to any computer system having a pointing device such as a touch panel, a mouse or a touch pad, and at least one display device. The video game program of the example embodiment may be supplied to the computer system via a wired or wireless communications line, instead of via an external storage medium such as the memory card 17. Alternatively, the video game program may be pre-stored in a non-volatile storage device inside the computer system.

Referring now to FIGS. 3 to 10, an outline of the video game program to be executed by the video game device 10 will be described.

Figure 3:
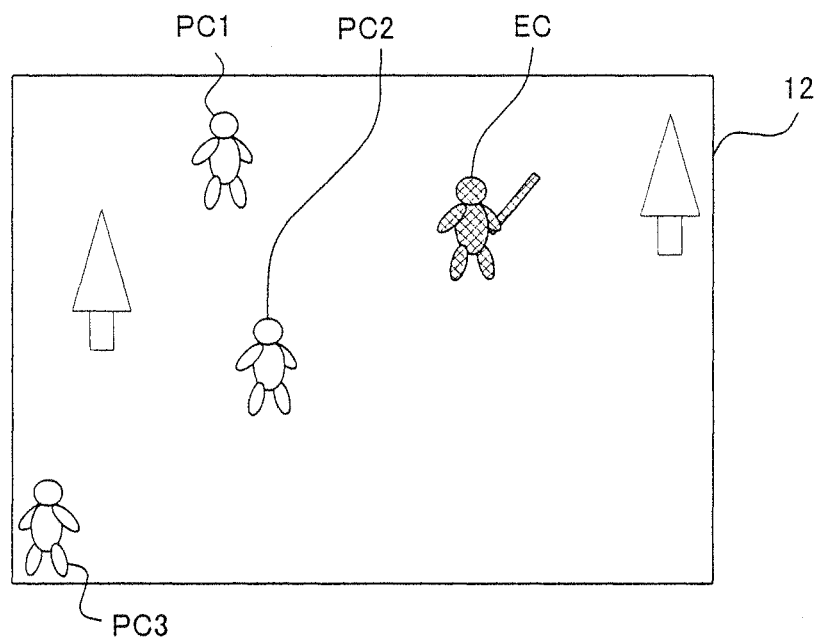
FIG. 3 shows an exemplary game screen.

When the video game is started, a portion of the game world is displayed on the second LCD 12 as shown in FIG. 3. There are a plurality of player characters and a plurality of enemy characters in the game world. While only three player characters PC1 to PC3 and one enemy character EC are shown in the screen in the example of FIG. 3, there are other player characters and other enemy characters in other portions of the game world. A player character is a character that can be operated by the player, and an enemy character is a character that is automatically controlled by the computer. While there is no input operation from the player, the player character may either stand still or may be controlled by the computer to move around as if the player character has its own will.

Figure 4:
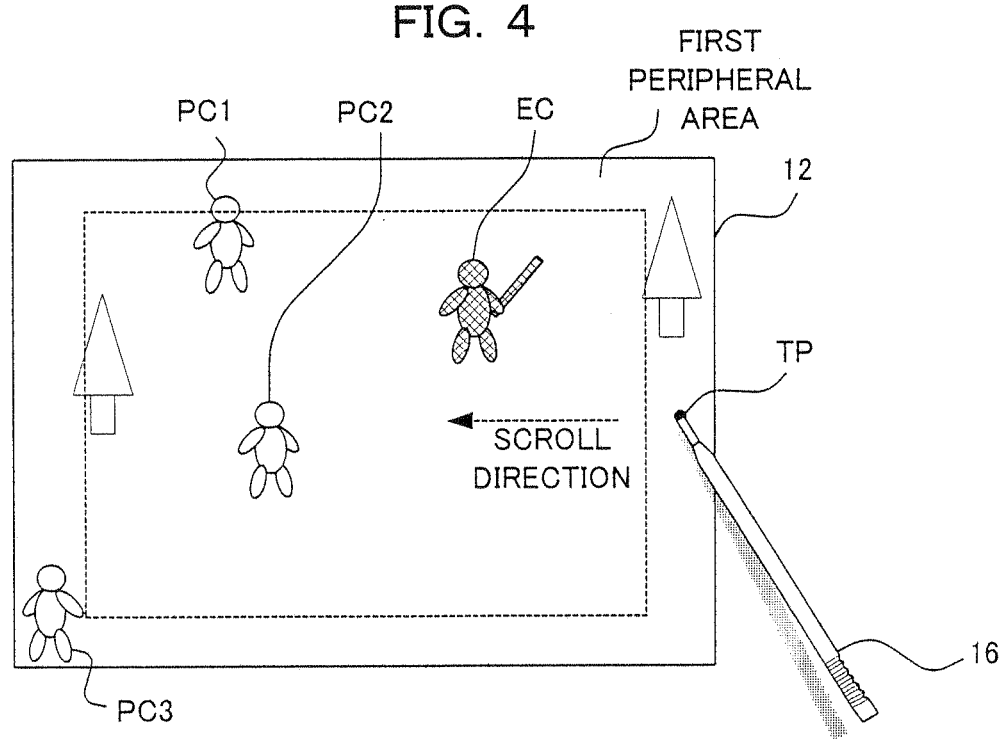
FIG. 4 shows another exemplary game screen.

The player can scroll the game image in an intended direction by touching a first peripheral area along the periphery of the display screen of the second LCD 12 with the stylus 16 as shown in FIG. 4. Through this scroll operation, the player can see other portions of the game world that are not displayed in the display screen.

Figure 5:
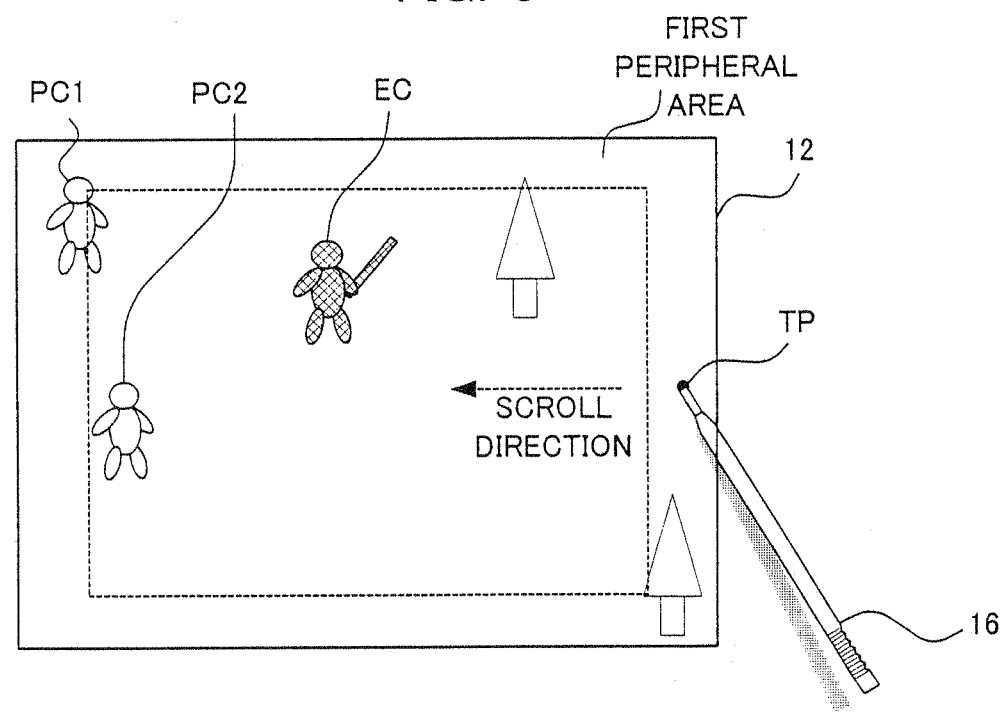
FIG. 5 shows yet another exemplary game screen.
Figure 6:
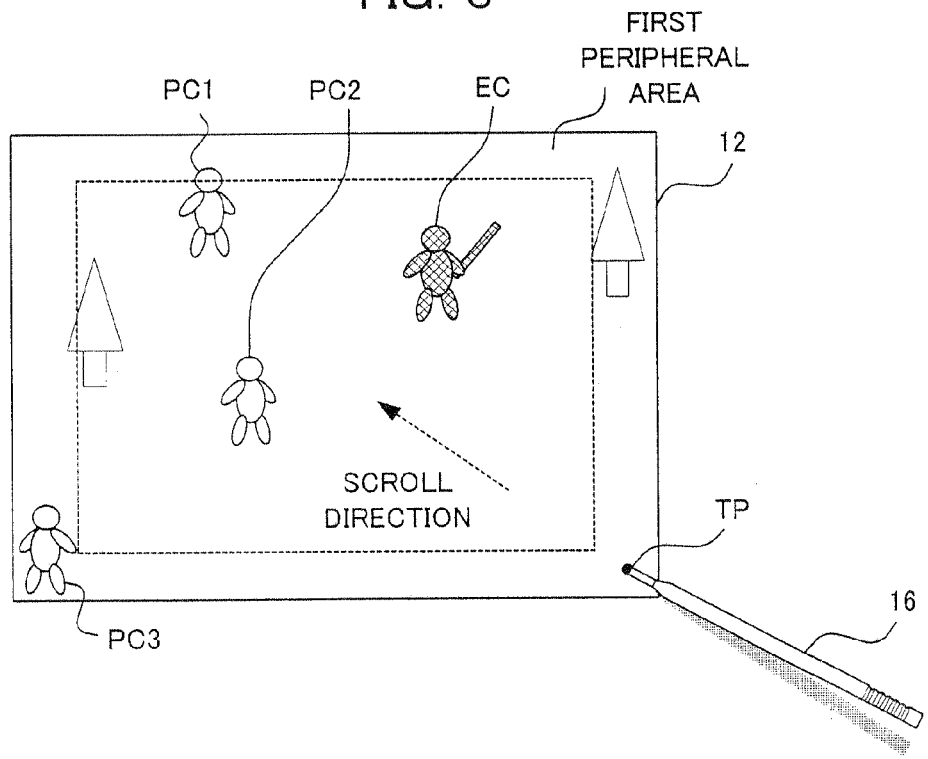
FIG. 6 shows yet another exemplary game screen.
Figure 7:
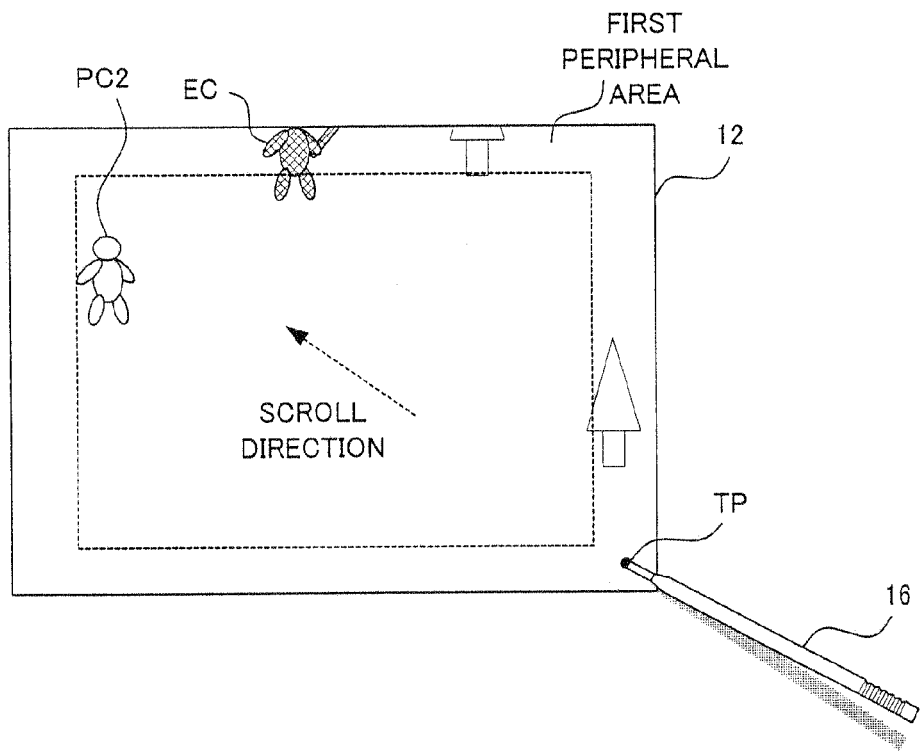
FIG. 7 shows yet another exemplary game screen.

The scroll direction in which the game image is scrolled is determined based on a contact position TP of the stylus 16 on the touch panel 15. For example, if the stylus 16 is contacted at the right edge of the display screen as shown in FIG. 4, the game image (game world) is scrolled in the leftward direction of the screen as shown in FIG. 5. Thus, the player can see the adjacent portion of the game world in the right direction to the portion being currently displayed in the display screen. For example, if the stylus 16 is contacted at the lower right corner of the display screen as shown in FIG. 6, the game image is scrolled in the upper left direction of the screen as shown in FIG. 7. Thus, the player can see the adjacent portion of the game world in the lower right direction to the portion being currently displayed in the display screen.

Any of a number of methods can be used for determining the scroll direction in which the game screen is scrolled. In one method, the scroll direction may be determined as being the direction from the contact position TP of the stylus 16 on the touch panel 15 to the center of the display screen.

Figure 8:
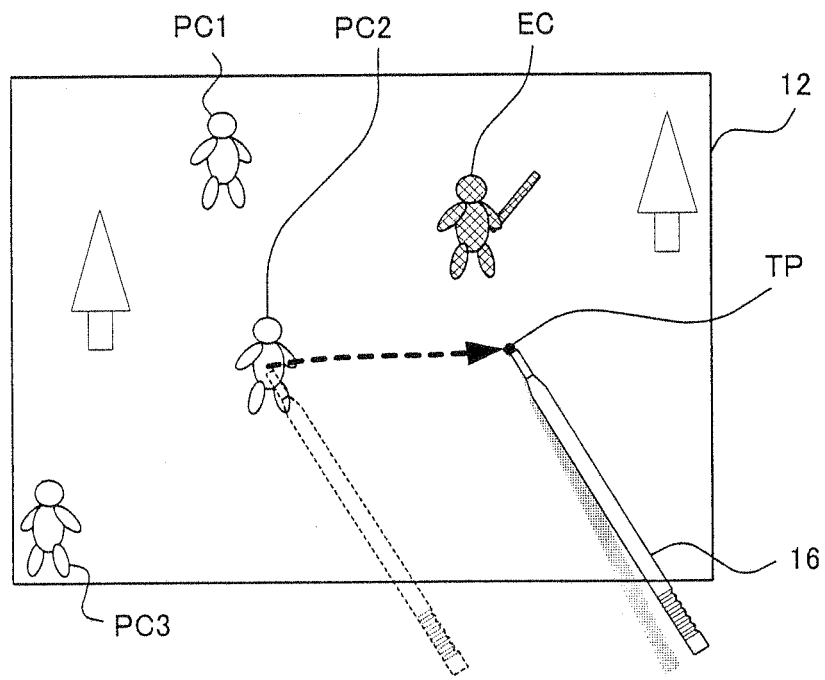
FIG. 8 shows yet another exemplary game screen.

Referring to FIG. 8, the player can give a move instruction to a player character by sliding the stylus 16 on the touch panel 15 starting from the position at which the player character is displayed. FIG. 8 shows an example of an input operation for moving the player character PC2 in the right direction of the screen.

Figure 9:
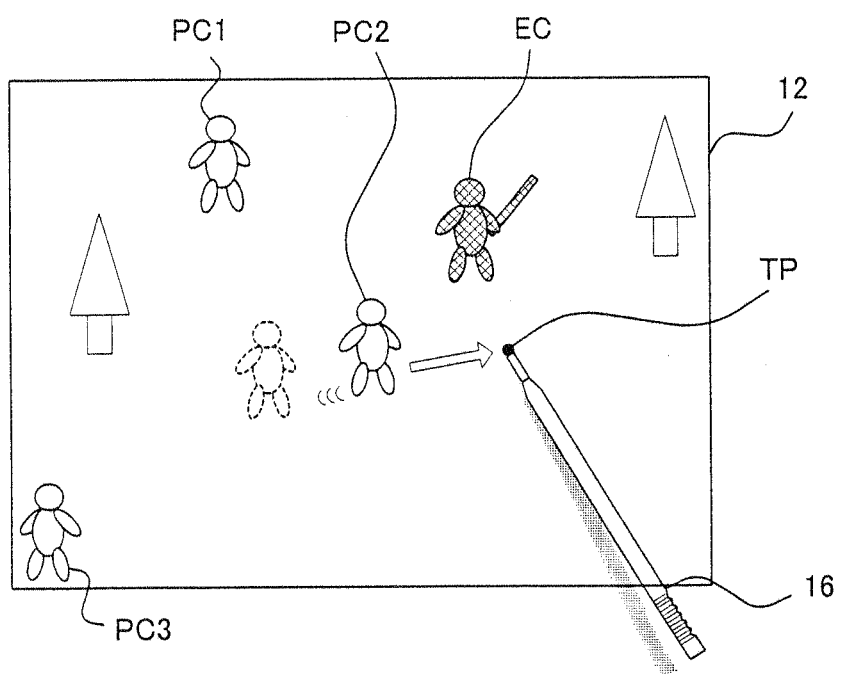
FIG. 9 shows yet another exemplary game screen.

The move instruction continues to be given to the player character until the player lifts the stylus 16 off the touch panel 15. The player character receiving the move instruction moves at a predetermined speed toward the contact position TP of the stylus 16 (more accurately, toward the point in the game world corresponding to the contact position TP) as shown in FIG. 9. Through this input operation (hereinafter referred to as a "move operation"), the player can guide an intended player character in an intended direction.

Through the move operation as described above, the player can guide the player character to a portion of the game world that is not currently being displayed in the display screen. Specifically, referring to FIG. 10, the player can scroll the game image in an intended direction while continuing the move operation by sliding the stylus 16 to a second peripheral area along the periphery of the display screen of the second LCD 12 during the move operation. As can be seen from a comparison between FIG. 4 and FIG. 10, the second peripheral area is different from the first peripheral area and is larger than the first peripheral area.

Figure 10:
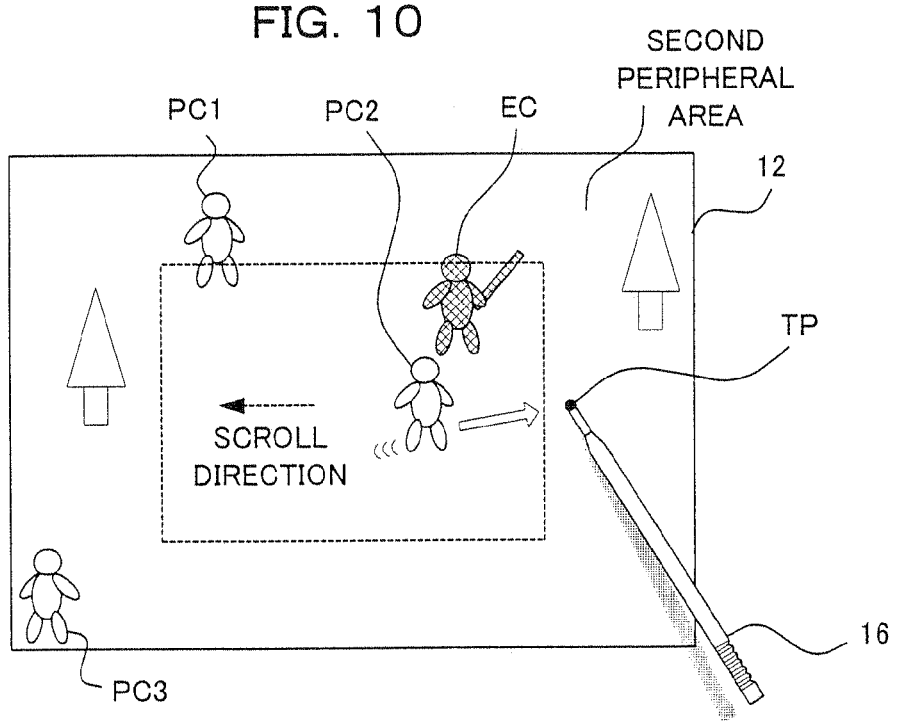
FIG. 10 shows yet another exemplary game screen.
Figure 11:
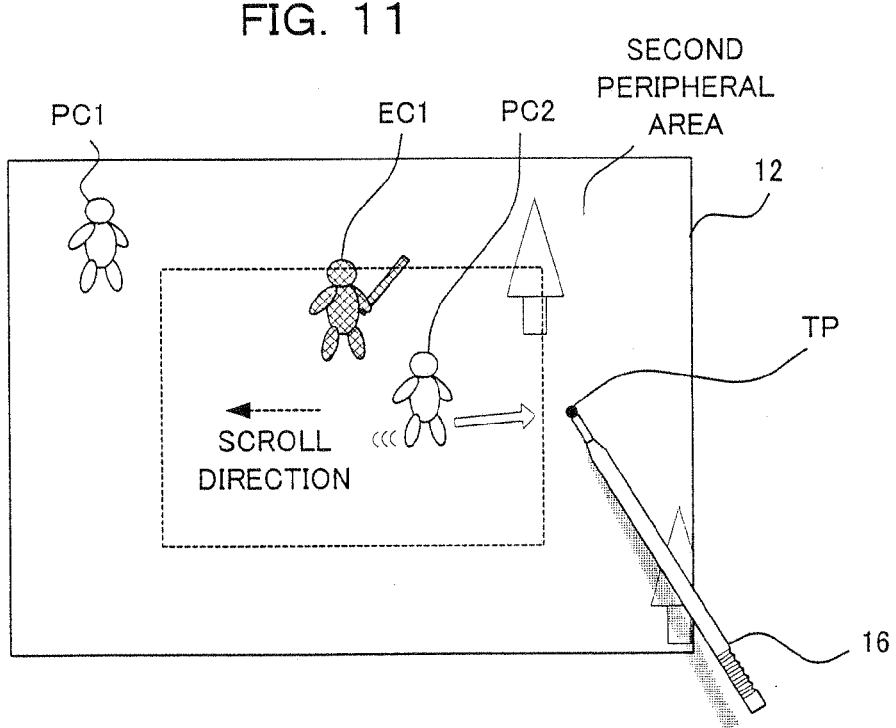
FIG. 11 shows yet another exemplary game screen.

Also in the scroll process during a move operation, the scroll direction of the game image is determined based on the contact position TP of the stylus 16 on the touch panel 15. For example, if the stylus 16 is contacted at the right edge of the display screen as shown in FIG. 10, the game image (game world) is scrolled in the leftward direction of the screen as shown in FIG. 11. Thus, the player can guide the player character PC2 in the right direction of the screen while checking an adjacent portion of the game world in the right direction of the screen to the portion being currently displayed in the display screen.

Any of a number of methods can be used for determining the scroll direction in which the game screen is scrolled during a move operation. For example, the scroll direction may be determined as being the direction from the contact position TP of the stylus 16 on the touch panel 15 to the center of the display screen, or the scroll direction may be determined as being the direction from the contact position TP of the stylus 16 on the touch panel 15 to the position at which the player character being moved is displayed.

In the present embodiment, the second peripheral area is larger than the first peripheral area. Therefore, during the move operation, it is possible to easily check the area into which the player character is moving, whereby it is possible to avoid a situation where an enemy character suddenly emerges in the display screen during the move operation at a point-blank distance from the player character. Note however that the second peripheral area does not have to be larger than the first peripheral area in the present invention. The second peripheral area may be smaller than the first peripheral area depending on the nature of the video game.

The scroll operation and the move operation as described above can be realized also when using position inputting means other than a touch panel. For example, where a mouse is used as the position inputting means, the scroll operation can be initiated when the player presses a button on the mouse after moving the pointer displayed on the screen onto the first peripheral area. In such a case, the scroll instruction is continued until the player releases the button on the mouse. The player can perform the move operation by moving the pointer displayed on the screen onto an intended player character and then moving the mouse while holding down a button on the mouse. In such a case, the move instruction continues to be inputted until the player releases the button on the mouse.

The operation of the video game device 10 will now be described in greater detail.

Figure 12:
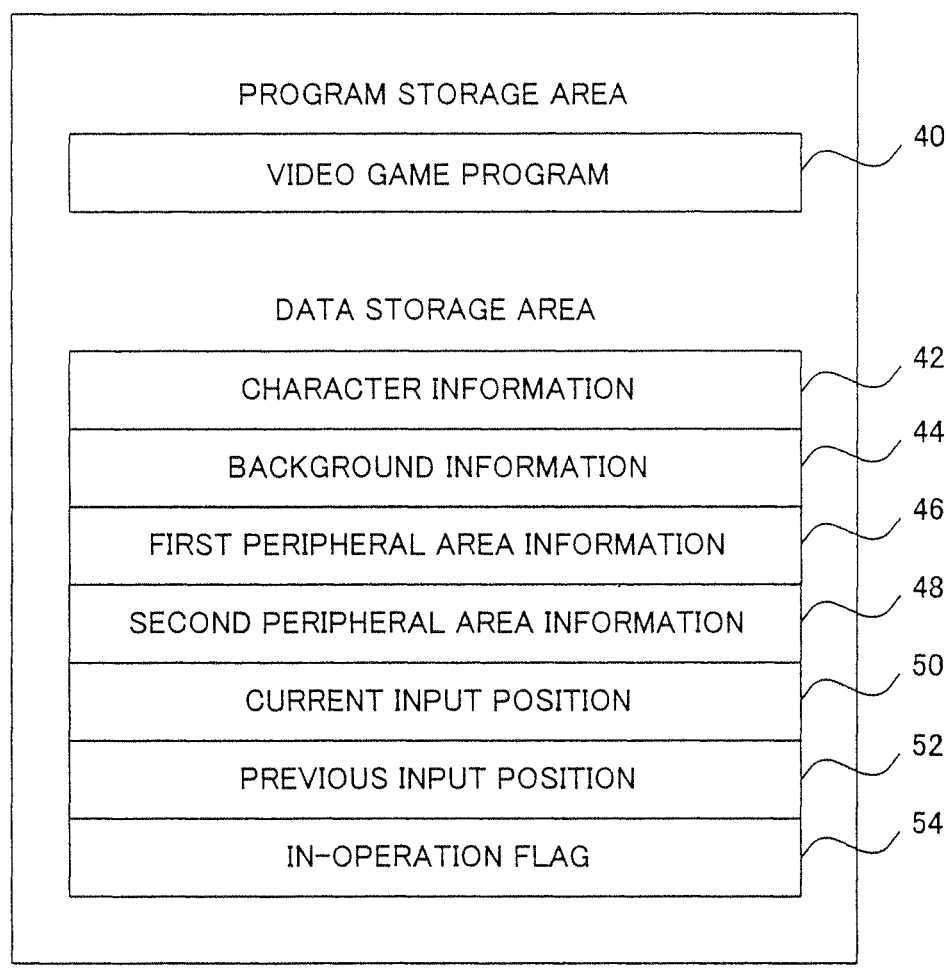
FIG. 12 shows a memory map of a RAM.

FIG. 12 shows a memory map of the RAM 24. The RAM 24 stores a video game program 40, character information 42, background information 44, first peripheral area information 46, second peripheral area information 48, a current input position 50, a previous input position 52 and an in-operation flag 54.

The video game program 40 is a program for instructing the CPU core 21 to perform the game process, and is loaded from the ROM 17a to the RAM 24 before the game process is performed.

The character information 42 is information regarding the player characters and the enemy characters in the game world. Referring to FIG. 13, the character information 42 includes image data and status data of the player characters and the enemy characters. The status data includes the current position and the operated object flag for each character. The operated object flag is a flag indicating whether or not the character is being the object of the move operation performed by the player. The image data is loaded from the ROM 17a to the RAM 24, and used for producing game images. The status data is updated as necessary as the game proceeds.

The background information 44 is information regarding elements, such as the ground and trees, forming the background of the game world. The background information also includes position information and image data.

The first peripheral area information 46 and the second peripheral area information 48 are information representing the range of the first peripheral area and that of the second peripheral area, respectively.

The current input position 50 is position data (a set of coordinates) representing the contact position TP of the stylus 16 on the touch panel 15, and updated at regular intervals based on the output signal from the touch panel 15.

The previous input position 52 represents the previous contact position TP detected immediately before the current input position 50.

The in-operation flag 54 is a flag indicating whether or not a move operation by the player as shown in FIG. 9 is currently being performed.

Figure 14:
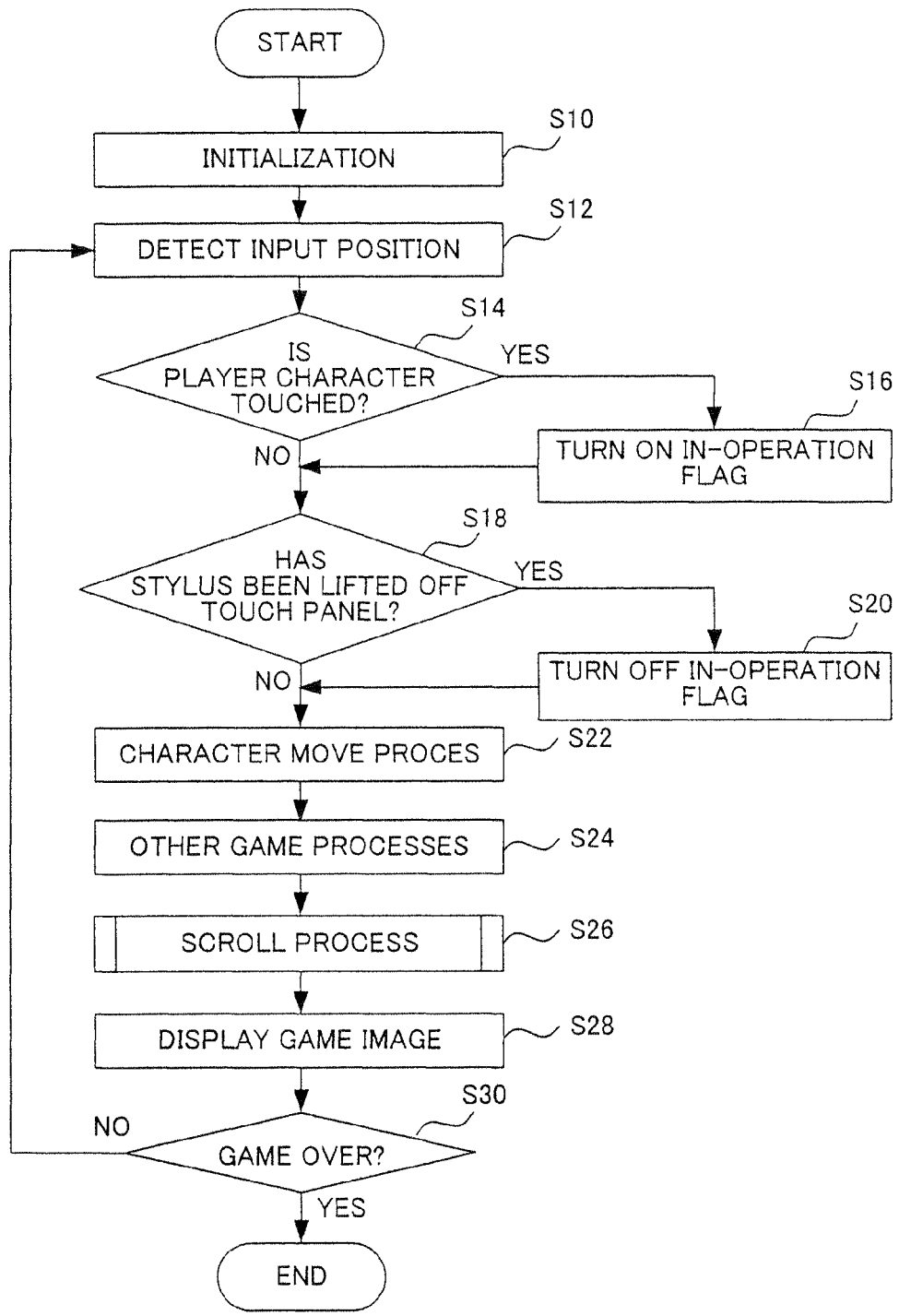
FIG. 14 is a flow chart showing the general flow of a game process.

Referring now to the flow chart of FIG. 14, the process flow of the CPU core 21 based on the video game program 40 will be described.

When the video game program 40 is executed, the CPU core 21 first performs an initialization process in step S10. The initialization process includes the process of placing player characters and enemy characters across the game world.

Then, step S12 to step S30 are repeated with a regular period in synchronism with the screen refresh period of the second LCD 12 (normally 1/60 second).

In step S12, the CPU core 21 detects the current input position based on the output signal from the touch panel 15, and stores the detected position in the RAM 24 as the current input position 50. The value of the current input position 50 before it is updated is stored in the RAM 24 as the previous input position 52.

In step S14, the CPU core 21 determines whether or not the player is touching any of the player characters with the stylus 16, based on the current input position 50 and the current position of each player character. More specifically, the CPU core 21 determines whether or not the previous input position 52 is "no input" and the current input position 50 corresponds to the display position of any of the player characters. If it is determined that the player is touching one of the player characters with the stylus 16, the in-operation flag 54 is turned ON in step S16, and the operated object flag of the player character being touched is turned ON.

In step S18, the CPU core 21 determines whether or not the stylus 16 has been lifted off the touch panel 15. If it is determined that the stylus 16 has been lifted off the touch panel 15, the in-operation flag 54 is turned OFF in step S20, and the operated object flags for all the player characters are turned OFF.

In step S22, the CPU core 21 performs the character move process. Specifically, the current position of the player character being moved (i.e., the player character whose operated object flag is ON) is updated so that the player character will be moving toward the position in the game world corresponding to the current input position 50 at a predetermined speed. If there is no player character whose operated object flag is ON, step S22 is skipped.

In step S24, the CPU core 21 performs various processes required for the game to proceed, e.g., the enemy character move process, the character animation process, and the game sound generation process.

In step S26, the scroll process is performed. The details of the scroll process will be described later.

In step S28, the CPU core 21 produces a game image reflecting the scroll process in step S26, and displays the produced game image on the second LCD 12.

In step S30, the CPU core 21 determines whether or not the game is over. If the game is over, the CPU core 21 terminates the video game program 40 and, if the game is not over, returns to step S12 to perform the process for the next frame.

Figure 15:
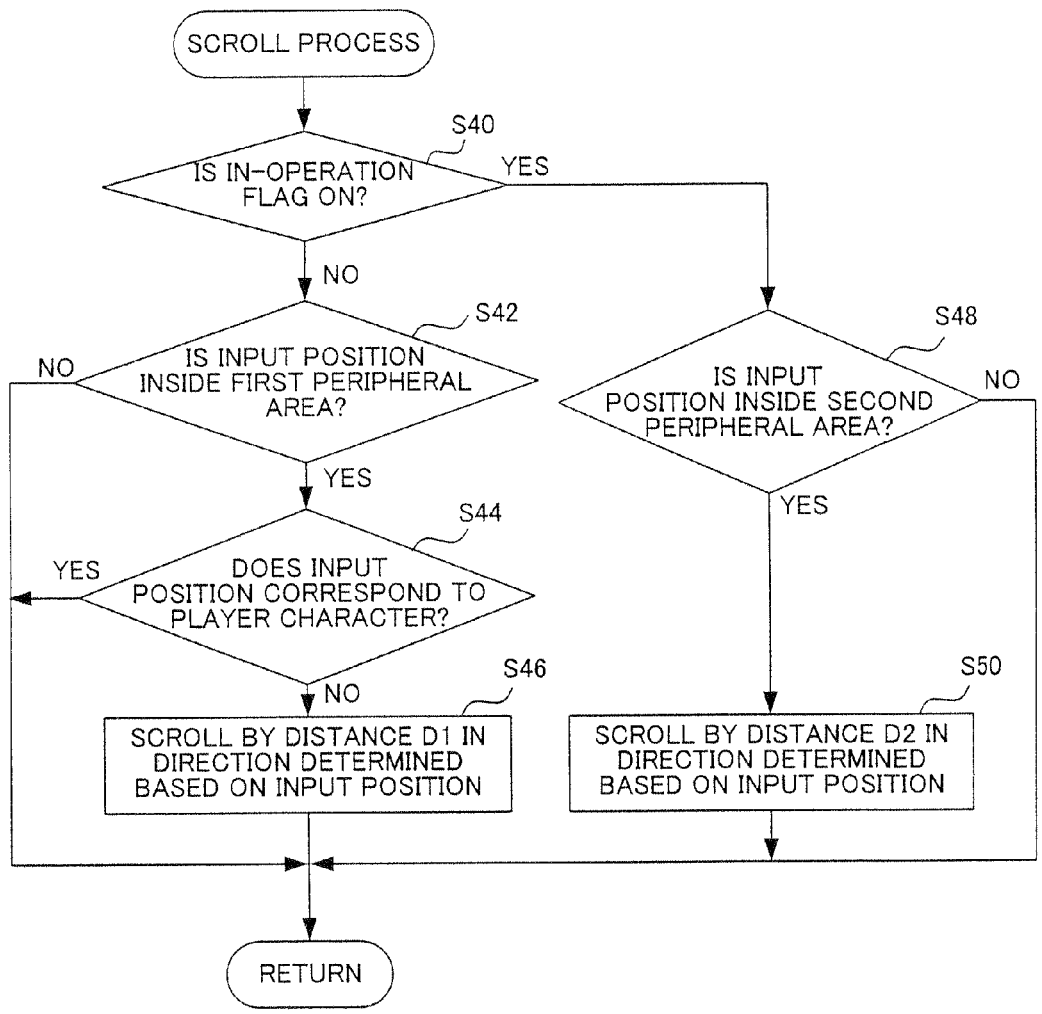
FIG. 15 is a flow chart showing the details of a scroll process.

Referring now to the flow chart of FIG. 15, the details of the scroll process will be described.

In step S40, the CPU core 21 determines whether or not the in-operation flag 54 is ON. If the flag is ON, the process proceeds to step S48 and, if the flag is OFF, proceeds to step S42.

In step S42, the CPU core 21 refers to the first peripheral area information 46 and the current input position 50, and determines whether or not the current input position 50 is within the first peripheral area. If the current input position 50 is within the first peripheral area, the process proceeds to step S44 and, if not, proceeds to step S28 of FIG. 14.

In step S44, the CPU core 21 refers to the current position of each player character and the current input position 50 to determine whether or not the current input position 50 corresponds to the position of any of the player characters. If the current input position 50 corresponds to the position of any of the player characters, the process proceeds to step S28 of FIG. 14 and, if not, proceeds to step S46.

In step S46, the CPU core 21 determines the scroll direction based on the current input position 50, and scrolls the game image in the scroll direction by a predetermined distance D1. Thus, the game image is scrolled by the distance D1 for each frame. Therefore, D1 is a value that defines the scroll speed.

Figure 16:
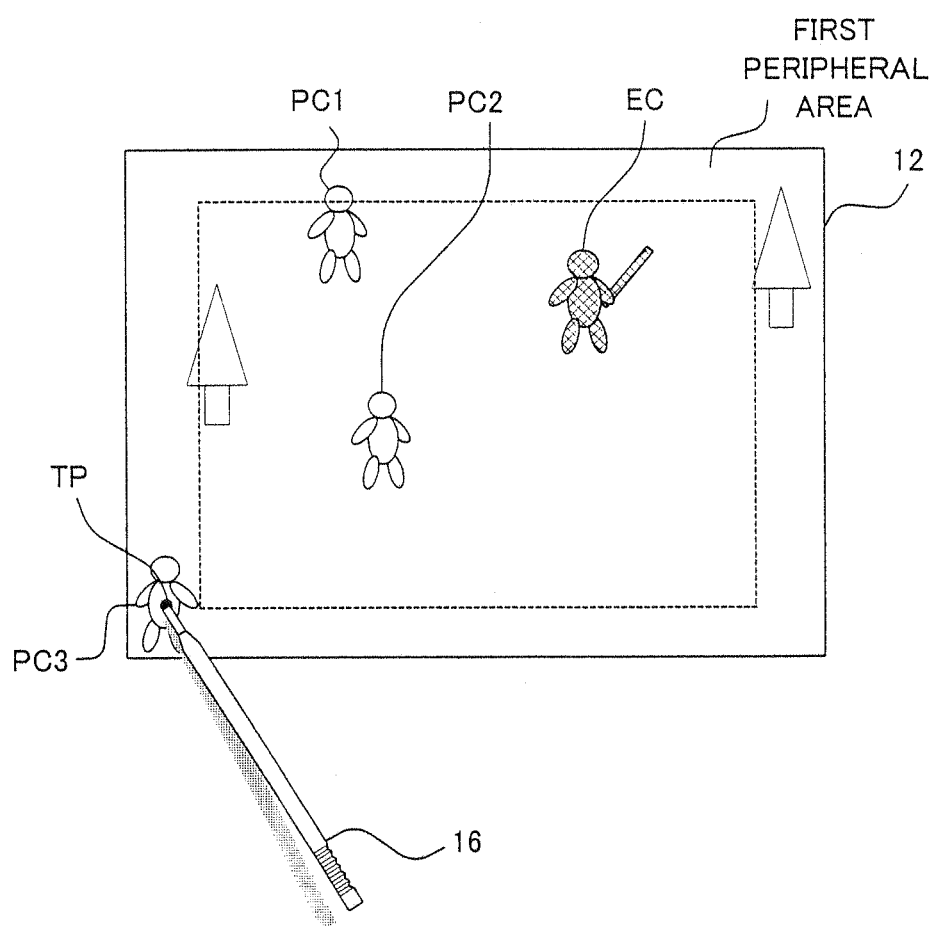
FIG. 16 shows yet another exemplary game screen.

If it is determined in step S44 that the current input position 50 corresponds to the position of any of the player characters, the scroll process of step S46 is skipped for the following reason. For example, when the player touches the player character PC3 with the stylus 16 in order to move the player character PC3 in first peripheral area as shown in FIG. 16, the scroll process (which may result in an erroneous operation) should not be performed against the intention of the player. Where the player is allowed to give any instruction by touching an enemy character or a tree with the stylus 16, the process can proceed from step S44 to step S28 of FIG. 14 not only when it is determined in step S44 that the current input position 50 corresponds to the position of the player character but also when it is determined in step S44 that the current input position 50 corresponds to the position of an enemy character or a tree. Thus, it is possible to prevent a scroll operation and another input operation from interfering with each other and resulting in an erroneous operation. For video games where such an erroneous operation is not particularly a problem, step S44 may be omitted.

In step S48, the CPU core 21 refers to the second peripheral area information 48 and the current input position 50, and determines whether or not the current input position 50 is within the second peripheral area. If the current input position 50 is within the second peripheral area, the process proceeds to step S50 and, if not, proceeds to step S28 of FIG. 14.

In step S50, the CPU core 21 determines the scroll direction based on the current input position 50, and scrolls the game image in the scroll direction by a predetermined distance D2. Thus, the game image is scrolled by the distance D2 for each frame. Therefore, D2 is a value that defines the scroll speed.

In the present embodiment, D2 is set to be smaller than D1. Thus, in a scroll operation, there is provided an improved response to a scroll instruction from the player and, in a move operation, the image is scrolled at an optimal speed according to the moving speed of the player character, whereby it is possible to prevent the player character from moving outside the display screen during the move operation.

While the peripheral areas are defined to extend entirely along the periphery of the display screen in the present embodiment, the present invention is not limited thereto. For example, for video games where the screen is scrolled only in the left-right direction, the peripheral area may be provided only along the left edge and the right edge of the display screen. Similarly, for video games where the screen is scrolled only in the up-down direction, the peripheral area may be provided only along the upper edge and the lower edge of the display screen.

While the scroll amount per frame is set to be D1 or D2 in the present embodiment, the example embodiment presented herein is not limited thereto. For example, the scroll amount may be varied depending on the distance from the center of the display screen (or the player character being moved) to the current input position 50. Typically, the scroll amount per frame may be larger as the distance from the center of the display screen to the current input position 50 is larger.

While the example embodiment has been described in detail, the foregoing description is in all aspects illustrative and not restrictive. It is understood that numerous other modifications and variations can be devised without departing from the scope of the example embodiment.

What is claimed is:

1. A non-transitory computer-readable storage medium storing a video game program for instructing a computer, being connected to a position inputting element for specifying a position on a display screen that displays a game image partially showing a game world and to a storage element, to perform:

display control for producing the game image including an object and displaying the produced game image on the display screen;

coordinate detection for sequentially detecting coordinate values indicating the position on the display screen, which is inputted via the position inputting element, based on an output signal from the position inputting element;

presence determination for determining whether or not the object is present at the position on the display screen, which is indicated by the detected coordinate values, based on the detected coordinate values;

scroll control for, when a result of the presence determination is negative, scrolling the game image being displayed on the display screen, in a direction corresponding to the position on the display screen, which is indicated by the detected coordinate values, wherein when the object is not present in the position on the display screen, which position is indicated by a first coordinate value at which position inputting to the position inputting element has been started, the scroll control starts to scroll the game image at the time when the first coordinate value is detected; and control information storing control for, when the result of the presence determination is positive, storing control information that indicates that movement of the object is controlled by a player, in the storage element.

2. The non-transitory computer-readable storage medium according to claim 1, wherein
   the video game program further instructs the computer to perform movement control for causing the object to move based on the detected coordinate values after the control information is stored in the storage element.

3. The non-transitory computer-readable storage medium according to claim 1, wherein
   the video game program further instructs the computer to perform area determination for determining whether or not the position on the display screen, which is indicated by the detected coordinate values, is present within a peripheral area included in a display area on the display screen that displays the game image, based on the detected coordinate values, and
   when the result of the presence determination is negative and a result of the area determination is positive, the scroll control scrolls the game image being displayed on the display screen, in the direction corresponding to the position on the display screen, which is indicated by the detected coordinate values.

4. A video game device, comprising:
   a position inputting element for specifying a position on a display screen that displays a game image partially showing a game world;

a storage element;

a display control unit for producing the game image including an object and displaying the produced game image on the display screen;

a coordinate detection unit for sequentially detecting coordinate values indicating the position on the display screen, which is inputted via the position inputting element, based on an output signal from the position inputting element;

a presence determination unit for determining whether or not the object is present at the position on the display screen, which is indicated by the detected coordinate values, based on the coordinate values detected by the coordinate detection unit;

a scroll control unit for, when a result of the determination of the presence determination unit is negative, scrolling the game image being displayed on the display screen, in a direction corresponding to the position on the display screen, which is indicated by the coordinate values detected by the coordinate detection unit, wherein when the object is not present in the position on the display screen, which position is indicated by a first coordinate value at which position inputting to the position inputting element has been started, the scroll control unit starts to scroll the game image at the time when the first coordinate value is detected; and a control information storing control unit for, when the result of the determination of the presence determination unit is positive, storing control information that indicates that movement of the object is controlled by a player, in the storage element.

5. A game processing method executed by a computer connected to a position inputting element for specifying a position on a display screen that displays a game image partially showing a game world and to a storage element, the game processing method comprising the steps of:

producing the game image including an object and displaying the produced game image on the display screen;

sequentially detecting coordinate values indicating the position on the display screen, which is inputted via the position inputting element, based on an output signal from the position inputting element;

determining whether or not the object is present at the position on the display screen, which is indicated by the detected coordinate values, based on the detected coordinate values;

when a result of the determining step is negative, scrolling the game image being displayed on the display screen, in a direction corresponding to the position on the display screen, which is indicated by the detected coordinate values, wherein when the object is not present in the position on the display screen, which position is indicated by a first coordinate value at which position inputting to the position inputting element has been started, the scrolling starts to scroll the game image at the time when the first coordinate value is detected; and when the result of the determining step is positive, storing control information that indicates that movement of the object is controlled by a player, in the storage element.

6. A video game system, comprising:

a position inputting element for specifying a position on a display screen that displays a game image partially showing a game world;

a storage element;

a display control unit for producing the game image including an object and displaying the produced game image on the display screen;

a coordinate detection unit for sequentially detecting coordinate values indicating the position on the display screen, which is inputted via the position inputting element, based on an output signal from the position inputting element;

a presence determination unit for determining whether or not the object is present at the position on the display screen, which is indicated by the detected coordinate values, based on the coordinate values detected by the coordinate detection unit;

a scroll control unit for, when a result of the determination of the presence determination unit is negative, scrolling the game image being displayed on the display screen, in a direction corresponding to the position on the display screen, which is indicated by the coordinate values detected by the coordinate detection unit, wherein when the object is not present in the position on the display screen, which position is indicated by a first coordinate value at which position inputting to the position inputting element has been started, the scroll control unit starts to scroll the game image at the time when the first coordinate value is detected; and a control information storing control unit for, when the result of the determination of the presence determination unit is positive, storing control information that indicates that movement of the object is controlled by a player, in the storage element.

* * * * *